United States Patent
Shamur et al.

(10) Patent No.: US 8,599,317 B2
(45) Date of Patent: Dec. 3, 2013

(54) SCENE RECOGNITION METHODS FOR VIRTUAL INSERTIONS

(75) Inventors: Eyal Shamur, Ra'anana (IL); Sheldon Katz, Ringoes, NJ (US); Gregory House, Doylestown, PA (US); Ximin Gong, Belle Mead, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 415 days.

(21) Appl. No.: 12/659,628

(22) Filed: Mar. 15, 2010

(65) Prior Publication Data

US 2010/0238351 A1 Sep. 23, 2010

Related U.S. Application Data

(60) Provisional application No. 61/160,117, filed on Mar. 13, 2009.

(51) Int. Cl.
*H04N 9/76* (2006.01)
*H04N 5/225* (2006.01)
*G06K 9/00* (2006.01)
*G11B 27/00* (2006.01)
*H04N 5/93* (2006.01)

(52) U.S. Cl.
USPC ............ 348/598; 348/169; 382/103; 386/280

(58) Field of Classification Search
None
See application file for complete search history.

(56) References Cited

U.S. PATENT DOCUMENTS

| | | | | |
|---|---|---|---|---|
| 5,264,933 A * | 11/1993 | Rosser et al. | | 348/578 |
| 5,850,352 A * | 12/1998 | Moezzi et al. | | 345/419 |
| 6,100,925 A * | 8/2000 | Rosser et al. | | 348/169 |
| 7,230,653 B1 * | 6/2007 | Overton et al. | | 348/584 |
| 8,483,549 B2 | 7/2013 | Steinberg et al. | | |
| 2003/0081813 A1 * | 5/2003 | Astle | | 382/103 |
| 2008/0167814 A1 * | 7/2008 | Samarasekera et al. | | 701/213 |

* cited by examiner

*Primary Examiner* — Jefferey Harold
*Assistant Examiner* — Sean Haiem
(74) *Attorney, Agent, or Firm* — Fay Kaplun & Marcin, LLP (57) ABSTRACT

A method of adding a virtual insertion to an image, according to an embodiment, includes extracting dynamic features from an input image, associating the dynamic extracted features with dynamic reference features in a reference feature database, generating a camera model based on the associations, mixing a virtual insertion into the input image based on the camera model, and outputting an image containing both the input image and the virtual insertion. According to another embodiment, a method of adding a virtual insertion to an image includes generating a biased camera model using a statistically selected subset of a plurality of non-fixed regions of the image, locating fixed reference objects in the image using the biased camera model as an entry point for a search, generating a corrected camera model using the fixed reference objects in the image, and adding a virtual insertion to the image using the corrected camera model.

22 Claims, 8 Drawing Sheets

SCENE RECOGNITION METHODS FOR VIRTUAL INSERTIONS

CROSS-REFERENCE TO RELATED APPLICATIONS

This application claims the benefit of U.S. Provisional Patent Application No. 61/160,117, filed Mar. 13, 2009, by Katz et al., titled "Scene Recognition Methods for Virtual Insertions," which is incorporated by reference herein in its entirety.

BACKGROUND

1. Field

Embodiments of the present invention relate to automatic recognition of scenes in streams of video, and more particularly, to the use of non-fixed elements of a scene as reference points in automated video scene recognition.

This invention can be used for applications where scenes need to be recognized in video. Examples may include recognition of scenes in order to add advertising logos, sporting event statistics, or other types of virtual insertions to broadcast video, for example. This may apply to platforms streaming video media, including but not limited to television (e.g., broadcast, cable, satellite, fiber), the Internet, and mobile devices (e.g., cellular telephones or other wireless devices).

2. Background

In the fields of, for instance, broadcast television and film making, automated scene recognition has become a highly developed art. In broadcast television, automated scene recognition has been used, for instance, to insert virtual advertising and graphic effects into live and recorded broadcasts as described in more detail in, for instance, U.S. Pat. No. 5,264,933 entitled "Television displays having selected inserted indicia" issued to Rosser, et al. on Nov. 23, 1993, the contents of which are hereby incorporated by reference in their entirety. In film making, similar techniques are used to automatically incorporate special effects into films. In some cases, this process has come to be termed "matchmoving".

The automated recognition techniques used typically rely on there being enough fixed recognizable structures in the scene such as, but not limited to, markings on a field of play, pillars, gates, seats, tables, stairs and billboards. Automated scene recognition techniques, therefore, typically have difficulty in operating in video footage in which there are few or no fixed landmarks such as, but not limited to, scenes in which the background is a crowd of people.

Current methods for scene recognition in video include searching for reference points within video scenes. Reference points may include groups of pixels or templates, lines, areas of texture; gradients, and other types of reference information or histograms. The term 'structure' may cover all of the above examples and others known in the field that specifies reference points. One example of a reference points is a "keypoint". Methods include template matching, line searching, keypoint searching, and other methods. Position information for reference points may be used to calculate models for scenes and the models in turn may be used to add virtual insertions to the video. Methods to determine reference points may include use of calibration sequences or shots containing the reference points. Many scene recognition methods are known in the art and the present invention is not meant to be constrained to a particular recognition method.

Current known methods in the field require fixed reference points as these points may be needed to calculate the homography from world to scene. These homographies should be calculated precisely and there is no room for biased results. If a reference point moves even slightly from its fixed location, this point is tagged as an outlier and removed from calculations. In case of too few fixed inliers, homography calculations can fail.

In addition to reference points needing to be fixed points, these reference points need to be easily recognized as they have to match only the corresponding point on the scene and not other points, and the match algorithm must be adapted for real time applications such as video applications in which it must maintain the video rate.

What is needed is a method of video scene recognition in which there are too few fixed points for known scene recognition methods to work.

SUMMARY

A method of adding a virtual insertion to an image, according to an embodiment of the present invention, includes extracting dynamic features from an input image, associating the dynamic extracted features with dynamic reference features in a reference feature database, generating a camera model based on the associations between the extracted features and the reference features, mixing a virtual insertion into the input image based on the camera model, and outputting an image containing both the input image and the virtual insertion.

According to another embodiment of the present invention, a method of adding a virtual insertion to an image includes generating a biased camera model using a statistically selected subset of a plurality of non-fixed regions of the image, locating fixed reference objects in the image using the biased camera model as an entry point for a search, generating a corrected camera model using the fixed reference objects in the image to refine the biased camera model, adding a virtual insertion to the image using the corrected camera model, and outputting the image having the virtual insertion in an output video stream.

According to an embodiment of the present invention, a method of tracking multiple virtual insertions in a video scene includes tracking a first virtual insertion using reference points obtained in a first search process, positioning a second virtual insertion using reference points obtained in a second search process, and tracking the second virtual insertion using the same tracking algorithm as with the first virtual insertion.

These and other features of the invention will be more fully understood by references to the following drawings.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention

Although the figures may show scenes from basketball or ice hockey games, the present invention may be applied to other sports and types of events or other applications requiring scene recognition in video.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiments merely exemplify the invention. The scope of the invention is not limited to the disclosed embodiments. The invention is defined by the claims appended hereto.

The embodiments described, and references in the specification to "one embodiment", "an embodiment", "an example embodiment", etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Embodiments of the present invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1:
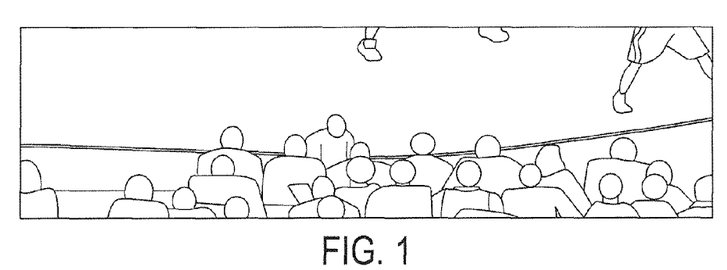
FIG. 1 illustrates a challenging scene for pattern recognition.

The technical problem addressed by embodiments of the present invention includes the difficulty of automatically recognizing scenes in which there are few or no fixed structures. For many video scenes, it may be difficult to find suitable reference points for known scene recognition methods. FIG. 1 shows an exemplary scene of a close up view of a basketball court which may be challenging for known methods due to a lack of texture on the court floor. Additionally, there may not be enough known references, such as known court lines for example, in the scene for reliable recognition. FIG. 1 lacks a view of known intersecting court lines, such as the intersection of the half court line and the near side line, for example, that may help calculate accurate position information for the scene. When recognizing scenes based on reference feature points, such as keypoints for example, a minimum number of points may be needed to generate an accurate scene recognition model, sometimes referred to as a scene camera model. In the example of a close-up of a basketball court, enough reference points on the court floor may not be obtainable to generate an adequate model.

Scenes may contain elements with good texture, but those elements may not be fixed within the scene, such as a scene containing audience members entering a venue. The use of non-fixed structures such as the spectators at a sporting event poses its own challenges. The audience members may enter a venue near the start of the event such that scene content stabilizes enough after the start of the event for conventional scene recognition methods to perform satisfactorily. However, it may be important to recognize scenes at the very start of the event while the background may still be changing significantly. An advertiser may be paying to have an advertising logo added as a virtual insertion into video scenes and may expect the logo to be shown at the very start of the event, for example. Reference points on fans entering a venue may be dynamic, since fans may be moving relative to background, while reference points on venue structure(s) may be static or fixed relative to background. Scenes possessing such challenging elements may not be easily recognizable using conventional methods. As an example, calibration shots taken before an event may not be valid at the start of the event due to audience members moving into empty seats. Additionally, audience members may move during the event. In this situation, one or more embodiments of the present invention may be used.

Figure 6:
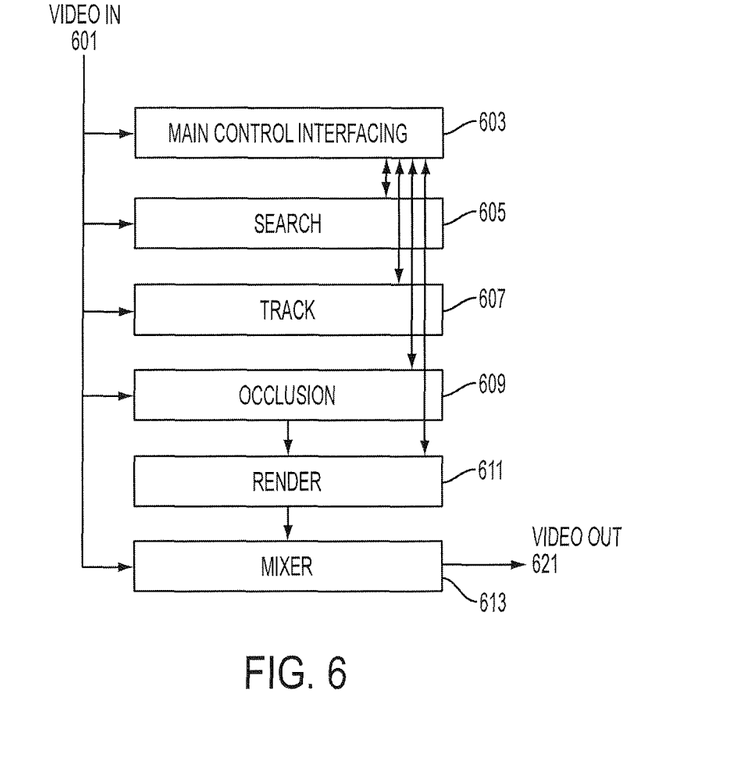
FIG. 6 illustrates an exemplary virtual insertion system, according to an embodiment of the present invention.

FIG. 6 illustrates a portion of an exemplary embodiment of the present invention particularly useful for adding virtual insertions to video. Input program video 601 can be modified to generate an output 621 containing insertions and enhancements. A main controller 603 can input data in real time, and control and coordinate subsystem processes 603-613. Search processor 605 can analyze input video 601 and calculate camera models and analyze scene geometry for background video scenes. Track processor 607 can track objects within the video to reduce processing requirements for search processor 605, and can enable smoother tracking of insertions and enhancements with background video 601. Occlusion processor 609 can determine when foreground objects should occlude insertions and enhancements and generate a key to enable mixer 613 to display occluded insertions and enhancements. Renderer 611 can receive camera models, insertion locations, occlusion keys, and other information to render insertions and enhancements for mixing with output video 621. This exemplary embodiment is for illustration only and this invention may be implemented with various other architectures comprising hardware, software, or combinations of hardware and software at one or more locations. Multiple renderers 611 and mixers 613 may serve as backend processors to provide multiple versions of insertions and enhancements to different viewers.

Embodiments of the present invention can use changing background scene information, such as audiences at events for example, and can use other scene information and data related to the video production to enable better video scene recognition. This method may be applied to enable the addition of virtual insertions into video. An embodiment of the present invention periodically updates one or more reference images using a statistically selected subset of plurality of non-fixed, or dynamic, regions of an image. In an embodiment, a dynamic region is one where the image structure used to derive the feature is completely non-fixed. In another embodiment, a dynamic region is one where the image structure used to derive the feature includes part of a static structure and part of a dynamic object. In still another embodiment, a dynamic region is one where the image structure used to derive the feature is completely static, but exhibits dynamic properties. As an example of this last embodiment, a dynamic object may cast a dynamic shadow on a fixed structure, with the fixed structure being used to derive the feature. The updating may be manually triggered by an operator or may be automatically realized as part of the normal search and track process. In embodiments, the statistically selected subset of the plurality of non-fixed structures of the image is used to generate a biased result. Additional information is extracted from the image using the biased result. The biased result is then corrected with this additional information. Finally, one or more logos can be inserted at varying positions in the scene.

Before the event, a scene may be calibrated but it may show empty seats, whereas after the game starts, the seats may be occupied. The background may change during the event as fans continue to move. Using reference points according embodiments of the present invention, the scene may be continuously calibrated to maintain enough adequate reference points to generate a useable model. Template matching or other techniques may be used and keypoints are only cited by way of example. To partially compensate for dynamic reference points moving within scenes, statistical methods such as random sample consensus (RANSAC) may be used to augment model calculations. Such statistical methods may enable calculating a model even though some reference point locations may not be consistent or congruent with the final model. Inconsistent or incongruent reference points may be discarded leaving enough consistent reference points to generate a useable model. Using backgrounds containing dynamic keypoints, such as a crowd of people for example, may seem counter-intuitive to those skilled in the art. Stationary anchor points may be preferred over moving image particles for more reliable scene recognition. Although fixed reference points may be favored over dynamic reference points generally, dynamic reference points can be made use of according to embodiments of the present invention in cases where fixed points may not be available. Methods useful for generating models for scene recognition using keypoints are described in Multiple View Geometry in Computer Vision by Hartley and Zisserman.

Reference feature points within video scenes may be determined from groups of pixels, lines, gradients, or other scene information and used for scene recognition in FIG. 6, search process 605. Once a scene is recognized, virtual insertions may be added to the video, for broadcast television enhancements, for example. Methods of using such reference points are known in the art and may include methods using template matching, line searching, keypoints, and other techniques. These methods may include a calibration step during which the recognition system is taught to recognize scene reference points. Such methods may favor selection of reference points which have particular characteristics which may enable reliable scene recognition. Such reference points may have characteristics such as high contrast with background video or fixed positions relative to background video, for example. The points may have characteristics such as corners like Harris or others, gradients—norm and/or angle, line intersections. Although a system may favor use or such optimal reference points, some scenes may lack required attributes. Scenes may lack necessary texture to distinguish reference points from background, for example. FIG. 1 shows a scene which may present a recognition challenge due to factors such as the basketball court floor appearing to have a more or less uniform color, for example. In other cases, reference points may have good texture within a scene, but may not be fixed within the scene relative to the background. As an example, reference points on a basketball court floor decal may have good texture and be fixed, but reference points on fans entering the venue may have good texture but be dynamic within the scene relative to background.

Figure 2:
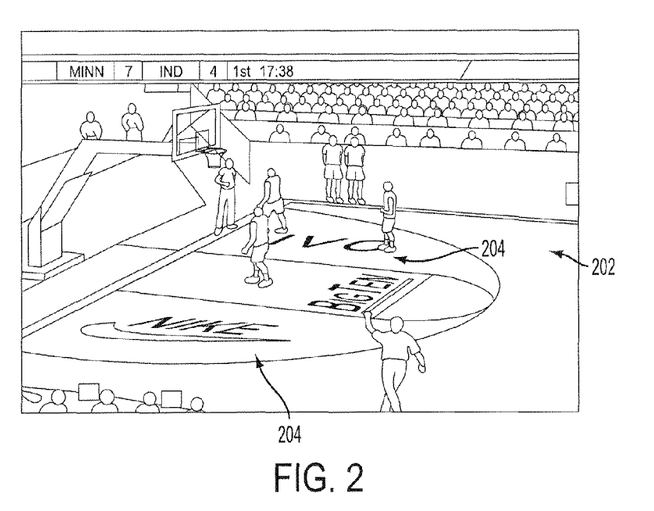
FIG. 2 illustrates virtual insertions added to a basketball scene, according to an embodiment of the present invention.

In an embodiment of the present invention, video scene recognition may be used to calculate camera models to enable addition of virtual insertions into the video. An example of virtual insertions of advertising logos 204 is shown in FIG. 2. The decals on the court floor were inserted into the scene such that they may appear to be part of the original video and real to viewers. An example system is described in U.S. Pat. No. 5,264,933 by Rosser, et al. In another example, viewers may see an advertising logo on a wall behind a batter during a baseball game that appeared to be real, but was not present at the original venue. In another example, viewers may see a first down line enhancement as described in U.S. Pat. No. 6,229,550 by Gloutemans, et al., during football game broadcasts. A virtual first down line may be inserted into a football game broadcast such that viewers see a line on the playing field corresponding to a first down marker. The line may look real to viewers, as if it were painted on the playing field.

Advantages of embodiments of the invention include, but are not limited to, the ability to use automated scene recognition on a significantly wider range of video and streaming images. Applications include but are not limited to the broadcast of live sporting events, such as American football, soccer, basketball, soccer, tennis, etc. It may be particularly useful for modifying the video stream of the broadcast at a location remote from the venue, where it may be difficult to obtain camera field of view (FOV) data from sensor measurements of the tripod and lens affiliated with a camera. Furthermore, embodiments of this invention may be advantageous for broadcasts where insertions are made in video from multiple cameras, as insertions may be made downstream without the need for tally signals from the broadcaster.

Figure 5:
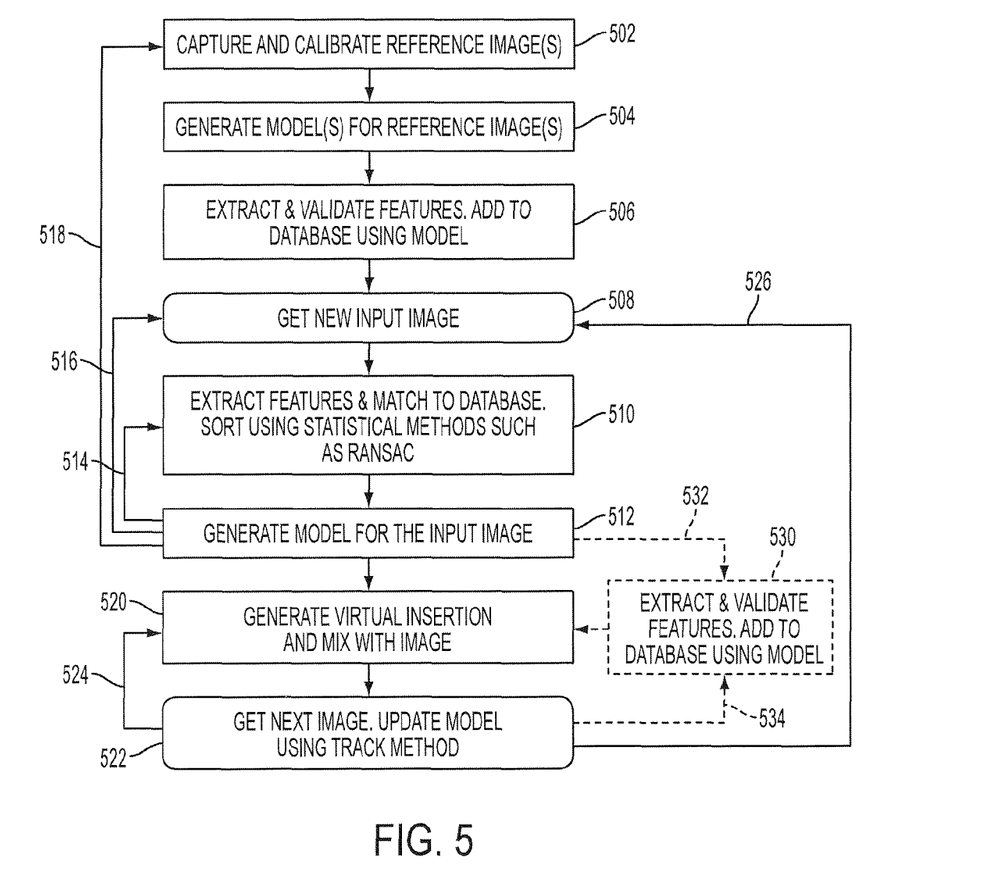
FIG. 5 is a flowchart of an exemplary method for adding a virtual insertion to an image, according to an embodiment of the present invention

FIG. 5 shows an exemplary embodiment of the present invention. In step 502, calibration shots for a scene to be recognized are captured and reference images are calibrated relative to a unifying reference space. This may involve an operator manually identifying the image position of features having known physical coordinates (i.e. lines and points on a basketball court). In step 504, a camera model for each reference image is generated using the association between reference image position and reference space location. This may be achieved using methods such as those that are commonly used with keypoints. For example, this may involve determining the homographic mapping between the reference image and a ground plane. In step 506, features are extracted from the reference images and may be evaluated for reliability. Validated features may be added to the database after the reference space locations are determined using the camera model. Based on updated calibration shots, the reference point data base may be updated using models generated for the reference images. Methods such as RANSAC may be used to minimize the effects of discrepancies in position of features between calibration shots.

In an embodiment of this invention, a camera model generated in step 506 is calculated as a 3×3 matrix. In another embodiment, the camera model may be generated using other dimensional matrices. Matrix parameters may include camera external parameters, such as camera position coordinates, and internal parameters, such as sensor vertical and horizontal scale factors. The camera model may contain multiple parameters that relate to physical measurements such as pan, tilt, roll, image distance, x position, y position, z position. Other parameters, such as parameters for radial lens distortion for example, may be utilized. Other methods, such as methods based on homography for example, may be utilized and the present invention is not meant to rely on a particular means to calculate a camera model. For example, the camera model may simply provide a homographic relation between the current camera view and some physical reference, such as the plane containing the basketball court. In another example, the camera model may include a homographic mapping between the input view and a reference image of the scene, wherein the reference image is used to define the location of a graphical insertion.

These methods may be extended to applications using more than one camera. Reference images may be categorized as corresponding to a particular camera number, in one example. A football telecast might utilize several cameras and it may be desired to add virtual insertions into multiple camera views. In one embodiment, the system may derive reference coordinates for the individual cameras, and use the coordinates when estimating the remaining parameters in the camera models. Systems may search scenes and recognize reference points as being imaged by a particular camera and models based on that camera derived and used for virtual insertions. In some applications, automatic methods may be used instead of relying on manual methods. Automatic systems may capture reference frames, identify image positions, cull reference points, and perform other tasks and methods as described herein.

Once an initial database of feature points has been established, a search process (605) may be applied to the input video, as detailed in FIG. 5. In step 508, a new input image is acquired via the search process. In step 510, features are extracted from the input image and matched to the database and the resulting associations are sorted using statistical methods such as RANSAC. Naturally, these features should be consistent with those generated for the database. In step 512, the feature associations are used to generate a camera model, which establishes a mapping between the input image and the unifying reference space. The search process may be iterative in generating an initial model using non-fixed features, and refine the model using additional feature information by returning (loop 514) to step 510. Furthermore, the search process may be restarted by returning (loop 516) to step 508, where a new input image is captured and new features are extracted. This may be automatically triggered by predetermined criteria, such as when a suitable model is not generated within a requisite amount of time, which may be important in some real-time applications. Furthermore, an embodiment also provides for retraining, by returning (loop 518) to the calibration stage. For example, a system operator may manually trigger the capture and calibration of one or more new reference images for camera shots that have poor recognition by the search process 605 (FIG. 6). Iterative loop 514 shown in FIG. 5 may include other search refinement methods outlined herein. As an example, model updates in step 512 may be refined using fixed scene references, e.g. lines, known to be in the scene based on models generated from dynamic reference points.

Initial calibration shots may be captured prior to an event or may be captured after the start of a telecast. For the latter case, virtual insertion opportunities may be missed due to failed scene recognition before calibration is completed. Calibration shots may be captured manually or automatically under computer control. Calibration shots should reflect scene perspectives used for virtual insertions during broadcasts, taking into account scene location, magnification, etc. Calibration shots may be captured during normal run time operation for scenes which a system fails to recognize. Shot capture may be automatic or may be done manually by an operator, for example. The number of search failures may be limited or reduced by this method and performance may improve with time.

New calibration shots may be captured as necessary to accommodate changing background scenery, 518. Scenes may be captured every few minutes near the start of an event as audience members are entering the venue, for example. Based on updated calibration shots, a reference feature point data base may be updated and updated models generated 506. Methods such as RANSAC may be used to minimize the effects of keypoints moving between calibration shots. In some instances there may be too few suitable reference points to generate reliable models and a relatively small number of inconsistent points may result in unusable models. In such cases, a recognition system may insure that calibration shots were captured at a sufficient rate to meet minimum requirements for reliable reference point model generation. This may require a new calibration shot every few minutes near the start of a basketball game, for example.

As illustrated in FIG. 5, when a camera model is determined successfully, the search process may hand-off to other components in the virtual insertion system. The search model from step 512 may be used to generate a virtual insertion, which may be mixed with the input video image in step 520. This may be realized using back-end components of the virtual insertion system in FIG. 6, such as occlusion processor 609, renderer 611 and mixer 613. A system operator may preview the inserted output and make adjustments to look of the rendered output. Track processor 607 may receive the next input video images, and update the search model by comparing features between successive images in step 522. Track processor 607 may also pass the camera model to the virtual insertion generation and mixing engines for completion of step 520. This feedback loop (loop 524) may continue with successive input images of the video sequence. Embodiments of the invention provide for returning (loop 526) to the search process, where a new input image is captured and new features are extracted in step 508. This may be triggered automatically through the detection of a scene transition or a failure in the track process, or manually by the operator possibly based on the quality of the rendered output from step 520.

Search processor 605 and track processor 607 components of the virtual insertion system in FIG. 6 may operate in parallel, possibly on the same input video image at the same time. In one embodiment, deriving intermediate tracking may begin immediately after a scene transition even though the search process may not succeed for a few frames after the end of the scene transition. The camera model may be generated for intermediate frames by propagating the search model from the search frame back to the scene transition, using intermediate track information. This approach is further detailed in U.S. Provisional Patent Application No. 61/165,370 by Deshpande. In another embodiment, when a search model is received from search processor 605, and there are no logos rendered in the video frame by renderer 611, track loop 524 is interrupted and the track model is reset to the search model. The intermediate tracking information may be maintained, but mapping of the input image to the unified reference space may be reset. This allows the use of a search model determined at the last moment before an insertion comes into view, which may reduce the error in the placement of insertions. In an embodiment detailed below, the track model is able to update to the search model while the logos are in view by temporarily resetting the reference locations of the logos.

Figure 4:
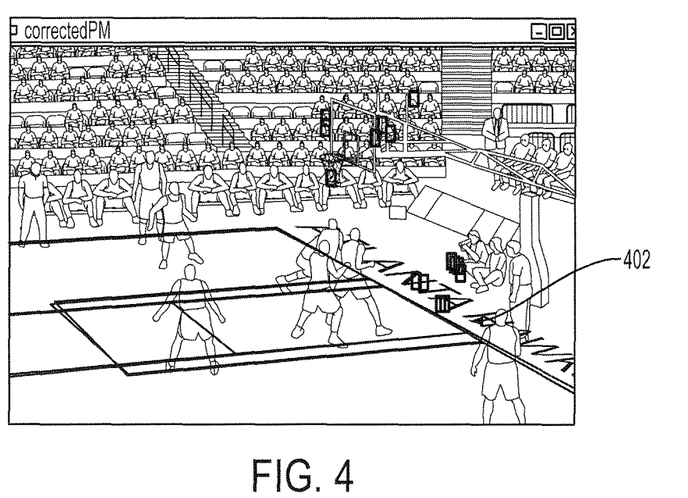
FIG. 4 illustrates the result of camera model verification for a basketball scene, according to an embodiment of the present invention.

New search camera models may be verified by any number of known methods before allowing insertions from step 520 to go to air. These methods may include using alternate search strategies, using corners for keypoint validation, using human operators for verification, or other means. As an example, using corners for keypoint verification may include finding corners having two-dimensional gradients to complement keypoints having mostly one-dimensional gradients. Keypoints having one-dimensional gradients may not be stable enough relative to one-dimensional lines, but corners having two-dimensional gradients may be stable relative to the intersection of one-dimensional lines. The use of corners to verify keypoints may increase confidence in scene recognition results. FIG. 4 shows an exemplary diagnostic scene that may be helpful in verifying a scene recognition model. The wireframe overlaid on the court lines shows how well the recognition model agrees with the physical basketball court lines. The overlaid boxes represent corners that may be used for model verification.

In addition to manually returning in loop 518 of FIG. 5, embodiments of the present invention also provide for semi-automated and automated updating of the search feature database. Similarly to step 506, features are extracted from the images and may be evaluated for reliability in step 530. Validated features may be added to the database after the reference space locations are determined using the camera model received from the search process (arrow 532) or received from the tracking process (arrow 534). This process may be semi-automated in that the system operator may verify the accuracy of the received models prior to updating the database. Alternately, the validation of camera models may be completely automated using internal error criteria in the feature association, and new database feature points may be added, for example, for highly reliable camera models. In one embodiment, the feature database is updated periodically as an event progresses, possibly synchronized with search model operations. In another embodiment, the feature database is updated on a continuous basis using a track model. In another embodiment, the semi-automated or automated feature extraction occurs on a pre-game sequence that takes the broadcast camera through a range of pans and zooms. A sort routine may be employed to limit the number of reference feature points to maintain real-time implementation. The camera model received at step 530 from the search process or the tracking process is subsequently passed to virtual insertion generation and mixing engines for completion of step 520.

Figure 3:
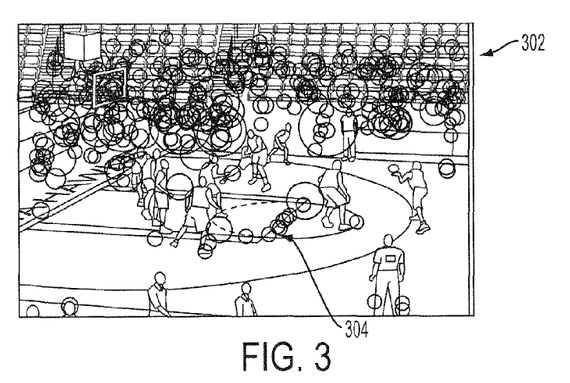
FIG. 3 illustrates keypoints used to recognize a basketball scene, according to an embodiment of the present invention.

Embodiments of the present invention can utilize a number of image search or recognition methods. FIG. 3 shows an example of keypoints that may be used to recognize a scene for a basketball game. More keypoints may be found in the stands 302 than on the court floor 304, in this case, due to greater scene texture in the stands. Other methods such as template matching or line searches may also be used in 508. Model generation may incorporate other methods such as culling of keypoints, statistical methods such as RANSAC, and error minimization methods such as Levenberg Marquardt Algorithm (LMA), among others in step 510. Some of these methods are described in Multiple View Geometry in Computer Vision by Hartley and Zisserman.

Known methods can be used to select and cull reference feature points for scene recognition. Keypoints too close to other keypoints or keypoints on uniform one-dimensional lines may not be easily distinguished and may be eliminated or culled, for example. Processing limitations may limit the number of reference points a system can process. In such instances, it may be helpful to limit the quantity of keypoints and select ones that may be more likely to result in useable models. Reference feature points closer to virtual insertion locations may be favored over reference points further away, for example. Reference points may be automatically chosen based on location, number of points, insertion locations, and other criteria, or this process may be augmented by human operators.

Even though a relatively small number of reference points, such as the keypoints shown in FIG. 3 as circles on the court floor 304, may not be adequate to produce a good scene recognition model, those reference points individually may be more useful than other background reference points subject to movement. Reference points on the court floor may also be more useful than other background reference points because they may be closer to the virtual insertion location within the scene. Reference points may therefore be weighted, by location or other methods, to account for relative usefulness in model generation. Reference points having higher weights may have correspondingly higher influence on model generation.

For some video scenes, it may be difficult to determine world coordinates for reference points during scene calibrations. This may occur when background scene elements are occluded, for example. An example of this is shown in FIG. 1 where the near side line is occluded by fans. In some instances, scene reference points in one shot may be also seen in other shots. Those other shots may contain additional known references or landmarks that may enable position determination. An example may be a shot where the near side line is occluded, but containing a floor decal. The decal may also be visible in one or more other shots which also contain known landmarks such as intersections of known court lines, for example. The floor decal position may be determined from another shot and used for calibrating the former challenging shot. Multiple shots containing a common landmark may all reference a single shot for landmark position information, as opposed to the shots relying on each other in serial fashion, to minimize relative errors between shots.

Different methods may be used to relate scene reference points to scene landmarks in order to calculate insertion models. An exemplary method according to an embodiment of the present invention is to use world coordinates to reference reference-points for model calculations. During calibration, reference point world coordinates may be determined relative to known landmarks in the scene. As an example, keypoints found on a basketball court decal may be referenced to known court lines in the scene such as the near and far side lines, baselines, free throw lines 304, center court line, coaches' lines, three point lines, and center circle line. In an embodiment, having at least two horizontal and two vertical lines for referencing can improve model accuracy. Error minimization techniques such as LMA may be used to improve model accuracy. Use of world coordinates may enable model verification based on known measurements of camera positions and landmarks, for example. A priori knowledge of parameters such as internal camera parameters and lens distortion parameters may be used to improve model accuracy, for example. Knowledge such as whether a camera uses a global or a rolling shutter may improve aspects of system performance such as photographic flash detection, for example.

Having different subsystems, the same reference world coordinates may improve intra-system coordination. As an example, search processor 605 may produce camera models having camera position coordinates based on world coordinates and pass those models to track processor 607, also using the same world coordinates. The coordinates system may be used by search processor 605 in determining the location of features (step 506 of FIG. 5) during training, and determining the location of features (step 510 of FIG. 5) for the search process itself. In some cases, using world coordinates as opposed to homography may enable optimizations based on physical parameters. As an example, image velocities or accelerations may be checked to determine whether they can be realized for a given camera setup. Furthermore, lens distortion may be handled directly. Other methods of position referencing may be used, such as referencing to a virtual reference image. Virtual insertions may be added to a virtual reference image, and then the virtual reference image may be used to render the final virtual insertion, for example. A combination of methods may be used, such as using homography to generate models and then converting the models to reference world coordinates, for example. The methods of this invention are not meant to be limited to a particular method of referencing position information.

Some scenes may be difficult to recognize while other nearby scenes in time may be easier to recognize. Some scenes may need to be recognized before insertions occur in later scenes, such as recognizing a scene near half court during a basketball game so a logo can come into view as the camera pans towards the view containing the logo, for example. In FIG. 2, scene recognition may occur near center court, before the logos near baseline 204 come into view as the camera pans from right to left, for example. Recognition may be done in one scene and scene models updated using a track processor 607 such as shown in FIG. 6, for example. Track processor 607 may update models based on tracking scene texture, for example. As an example, a basketball scene at half court may be recognized and scenery tracked to the side of the court as the camera pans. A logo inserted near the court baseline may be inserted based on a model generated by a tracking subsystem, as described in U.S. Pat. No. 6,741,725 by Astle.

Scene cuts, dissolves, and flashes can provide scene recognition challenges. Verification means can be used to verify cuts, dissolves, and flashes before insertions. Distinguishing cuts from flashes can be challenging. New models may need to be calculated following cuts and dissolves, but flashed scenes may use similar models following a flash to those used just before the flash. A threshold function may be employed so new models, with less than threshold differences from old models, may be attributed to flashes, instead of cuts. Old models following flashes may be retained to avoid sudden shifts in virtual insertion positions following flashes. A priori knowledge of camera shutters, such as whether a camera uses a rolling shutter, as well as information such as the reflectivity of scene surfaces, for example, may aid flash detection.

Models may be saved and subsequently used for new events at the same venue. This may preclude the need for pre-event calibrations and may improve system performance for subsequent events. Fixed reference points may be valid for subsequent events while dynamic reference points may not be. Accordingly, fixed points may be saved while dynamic ones may be discarded. Using backgrounds containing dynamic keypoints, such as a crowd of people for example, may seem counter-intuitive to those skilled in the art. Stationary anchor points may be preferred over moving image particles for more reliable scene recognition. Although fixed reference points may be favored over dynamic reference points generally, dynamic reference points can be made use of according to embodiments of the present invention, particularly in cases where static points may not be available.

One embodiment of this invention uses non-fixed reference feature points to generate an accurate scene-world homography or model. Dynamic reference points are extracted as a reference points during calibration or during auto learning that runs in the background during the operation. Dynamic reference points can be located on fans for example. Fans may move in their seats or may stand and leave their seats. Reference points on fans may not be useful for known methods in the art, as they may produce incorrect modeling with severely biased results, but they can be used in embodiments of the present invention.

Figure 7:
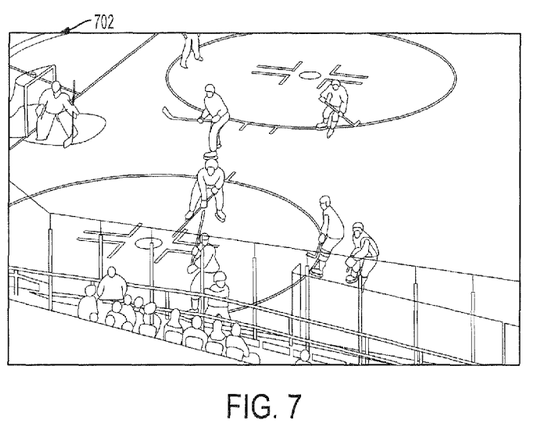
FIG. 7 illustrates a scene that lacks fixed structures but has non-fixed structures.

An example of a scene that lacks fixed reference points but has moving objects (e.g., fans) is shown in FIG. 7. Most of this ice hockey field image is the ice floor plane, which has limited textured structures. Players cannot be used as reference points, as they may move rapidly with respect to the background. Goalkeepers may occlude goal structures, so very few reference points can be extracted from the goal structure. Accordingly, it is difficult to construct a camera model using only fixed reference points. However, fans that are located at the lower left corner of FIG. 7 may be used as non-fixed reference points. Embodiments of the present invention may include all or part of the next steps, depending on the type of scene to be recognized.

In an embodiment, the first step to compensate for dynamic reference points includes using a statistical method such as RANSAC, a match algorithm, and/or a reference point structure description in a special way. Used traditionally, RANSAC may enable calculation of a model even though some reference point locations may not be consistent or congruent with the final model. Inconsistent or incongruent reference points may be discarded, leaving enough consistent reference points to generate a useable model. However, the traditional RANSAC approach may not work if the reference points move or show inconsistency. As a result, there may not be enough consistent reference points to generate a useable model, or a severely biased model may result.

In order to have a useable result in such cases, embodiments of the present invention loosen the tight threshold which may be used by RANSAC or other statistical methods for fixed reference points, and/or amends the reference point structure description to be less rigid, for example intensity/gradient average of group of pixels instead of the intensity/gradient itself, and/or uses less rigid matching methods. Known matching methods can be used if thresholds are loosened.

Figure 8:
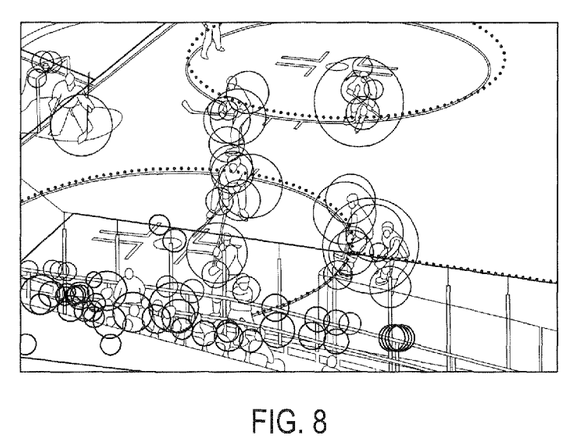
FIG. 8 illustrates non-fixed structures used as references, according to an embodiment of the present invention.
Figure 9:
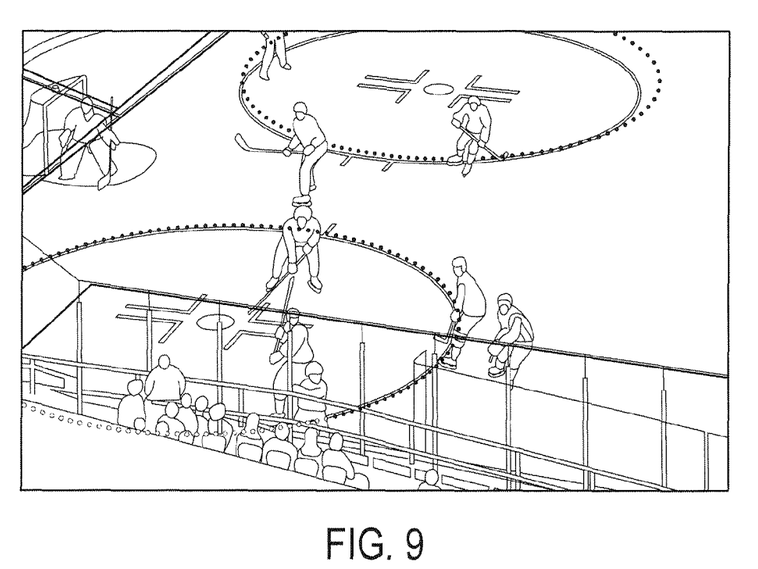
FIG. 9 illustrates a biased result generated from using non-fixed structures, according to an embodiment of the present invention.

Accordingly, an initial camera model is generated using a statistically selected subset of a plurality of non-fixed regions of the image. This approach may generate a biased result. FIG. 8 depicts the use of non-fixed reference points. To be useful, a reference structure needs to have two dimensions. One-dimensional objects, such as straight lines, may be difficult to use in pattern recognition, because it is difficult to tell where on the line a specific point exists. Circles, such as those located on the ice in FIG. 7, are difficult for machine recognition. When a sufficient number of fixed, two-dimensional objects are not available, non-fixed objects may be used instead. The circles shown on FIG. 8 show the reference points taken in an exemplary image. Most of the reference points are located on fans in the lower left corner of the scene. Since these reference points are located on moving objects, the result is biased, as can be seen in FIG. 9. The homography biased result is shown with dots. It can be easily noticed that the ice hockey field lines are not aligned with the homography found.

In an embodiment, the second step to compensate for dynamic reference points includes correcting the biased results. This may be done by extracting additional information from the image.

Figure 10:
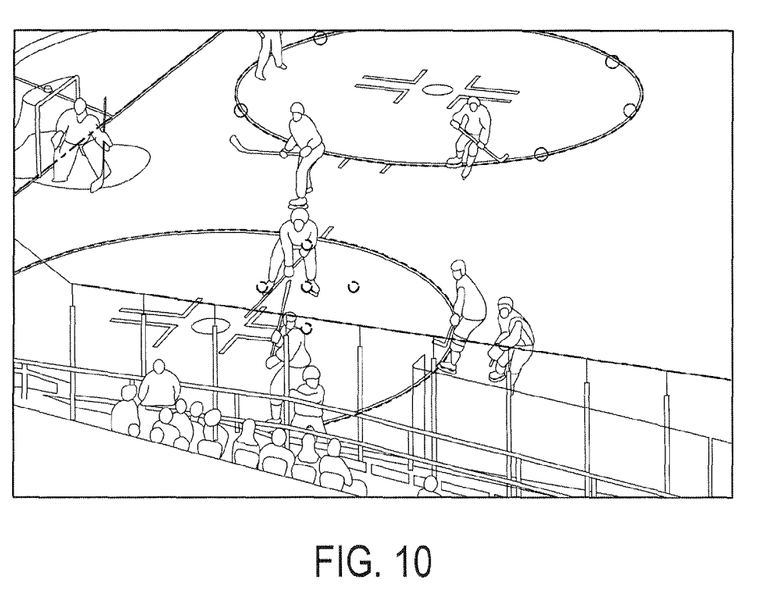
FIG. 10 illustrates the results of a search for additional information in the image using the biased result of FIG. 9, according to an embodiment of the present invention.

Embodiments of this invention may use the biased result from the previous step in order to extract additional information from the image. The biased result generates approximate information regarding the location of the reference points, lines or other structures on the scene. This approximated information is then used as a starting point for a restricted area search. Since the area to be searched is restricted and there may be only one candidate reference point, line or other structure to match, this search can succeeded easily. For example, line or arc detection may be challenging in a scene containing a lot of noise. The gradients or edges that lines or arcs have can be easily affected by noise. In embodiments of the present invention, line and arc detection in a noisy background may be easier to accomplish. FIG. 10 shows the result for lines and arcs/circles after such a restricted search. As can be seen, the markings on the ice have been accurately identified.

In one embodiment, the extra information extracted is associated with the boundary of the playing surface. For example, professional hockey rinks have a line around the bottom of the boards near the ice as shown by reference 702 in FIG. 7. Alternately, the top of the boards or top of the glass may be used for camera model alignment. Similarly, basketball courts have side and end lines whereas the out of bounds region may be colored differently than the main floor, as shown by reference 202 in FIG. 2. The location of this boundary alone is generally not sufficient to derive a camera model. It may be difficult to derive the effect of a camera zoom from a boundary end, particularly when the camera is zoomed in (narrow field of view). However, the boundary may be used to refine a camera model given an approximate camera model derived using non-fixed points. For example, the location of line 702 in FIG. 7 may be sufficient to correct for a translational shift in the camera model, which may be represented as a shift pan or tilt value.

In an embodiment, the third step includes generating an accurate model using the additional information, by recalculating the model using the otherwise not easily recognized reference points (e.g., lines, arcs, and circles).

In an embodiment, the homography is calculated again using pairs of points. Each pair contains a point on the scene and its reference point in the world coordinate system. This approach may be restricted as it needs a minimum set of points or lines and it cannot guarantee a good result while having outliers. Further information on calculating homography using pairs of points can be found in Multiple View Geometry in Computer Vision by Hartley and Zisserman.

Figure 11:
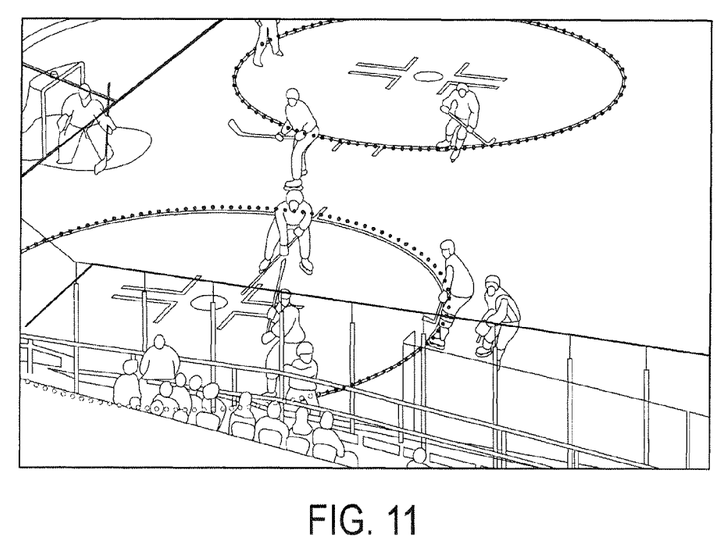
FIG. 11 illustrates the correction of the biased result of FIG. 9 with the additional information of FIG. 10, according to an embodiment of the present invention.
Figure 12:
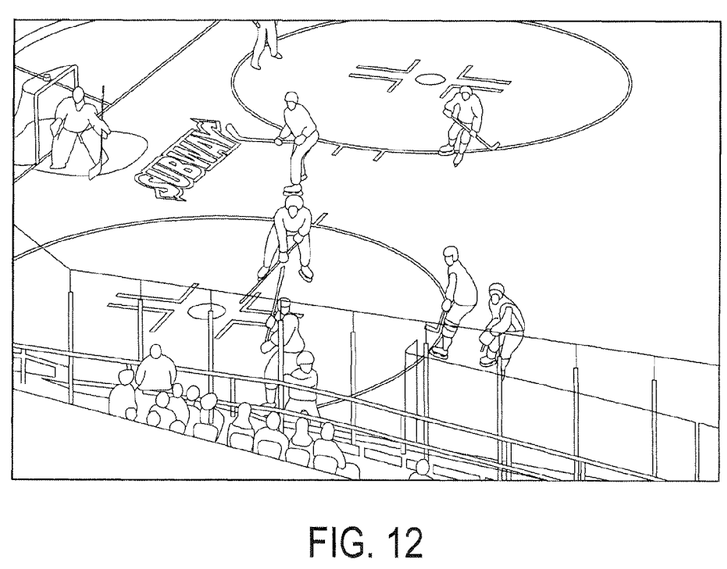
FIG. 12 illustrates a virtual insertion added to an ice hockey scene, according to an embodiment of the present invention.

In an embodiment, the model/homography is found that minimizes the distances between the points on lines or arcs found on the scene from the model correction and their corresponding reference points in the world coordinate system. A minimization algorithm such as Gauss-Newton or Gradient descent, LMA, or any other algorithm can be used to calculate the best model/homography that generates the smallest accumulated distance. The first guess for this algorithm is the result of stage one (e.g., the biased result). The final result of this step may be an accurate camera model/homography. An exemplary final accurate result is shown in FIG. 11, in which the homography result is aligned with the ice hockey field lines. One commercial implementation, for example, of this embodiment may be virtual advertising logos added to a scene. FIG. 12 shows a logo added to an ice hockey scene using a described embodiment.

For many virtual insertion applications, it may be desirable to add multiple simultaneous virtual insertions into a single scene. As an example, it may be desirable to insert multiple advertising logos on glass boards during a hockey game telecast. As the broadcast camera pans from side to side following game action, viewers may see a plurality of virtually inserted advertising logos on the glass boards surrounding the rink. In some cases, a plurality of such logos may be visible in a single scene. One logo may be visible on the glass behind a goal and, as the camera pans towards mid-ice, another logo may come into view. There may be time intervals when both logos are visible simultaneously.

When generating search or track models as shown in FIG. 6, it may be necessary to minimize model errors so that logos are accurately inserted or positioned within scenes. Models may need to be accurate in absolute terms that relate the mapping from world coordinates in the unified reference space and image coordinates in the input video. Models may need to be accurate in relative terms, such as the image position of logos in relation to identifiable landmarks in the scene as the boundary of the playing surface, or other logos inserted into the video. Model errors may cause distortions, misplacements, jitter, or other visible artifacts within scenes. Artifacts may be observed during model changes or corrections, for example.

It may be possible to sequentially update models using either search or track methods. Individual logos may be inserted using individual cameras models so that model differences may not need to be reconciled. Using just a search method may require too much processing to recognize scenes in real time. It may be that missing search recognitions for frames at the beginning of sequences is acceptable but that missing search recognitions later during sequences is unacceptable, for example. It may be that sequential search models differ enough to cause visible artifacts, in another example. Additionally, using just a tracking method may cause unacceptable error accumulation. Tracking, on the other hand, may provide smoother insert trajectories. Tracking methods which search for image texture near insert locations may limit some errors seen with search methods, averaging methods may smooth insert trajectories, limits for sequential models may limit insert artifacts, etc. In many instances, it therefore may be desirable to combine both search and track methods for virtual insertions.

In an example, during a basketball game telecast it may be desirable to insert two logos on court floor 204, one on the left and one on the right sides of the court. Suppose the left logo is shown first in a particular sequence and the camera pans from left to right. Tracking may be relatively smooth as the first logo is going out of view. As the second logo is about to come into view, positioning errors for the second logo may be intolerable. This error may be caused by tracking errors accumulated while the camera panned and the first logo tracked. Tracking errors may accumulate over tracking time and distance and may increase as both time and insert point distances within scenes increase, for example. To overcome this model inaccuracy, a new search may be used to generate a better model. The tracking model may be updated by the better search model at this point, so that when the second logo becomes visible, its location is determined by the better search model.

Using previous methods, the track model would need to be updated before a second logo comes into view, but after the first logo has gone out of view, in order to avoid noticeable artifacts due to live model switching. In some situations, however, this time window, when both logos are out of view, may not exist. This may be true when pluralities of logos are placed relatively close to each other within the same field of view. This may become more acute with more logos and as logos are positioned closer to each other. In such a case, simply updating tracking with a new search model may cause logos already in view to show artifacts, for example. Tracking may need to be maintained for the sake of smoothness, while logo accuracy may need to be obtained through a logo management scheme such that logos coming into view retain correct image positioning, for example. This may be achieved by using corrected search models to recalculate logo image locations for logos coming into view, using embodiments of the present invention.

2D image coordinates may be transformed into 3D world coordinates using pre-existing track models. Logos coming into view may be positioned accurately within scenes by a search method and given world coordinates. Because the existing track model is maintained, logos in view may not show visible artifacts or change when the new search model is applied to logos coming into view. Such updating may enable one or more logos already in view to be maintained by track such that visible artifacts are not introduced. Otherwise, a model difference introduced by simply updating the tracking model with the camera model could cause the first logo to jitter, for example. The second logo coming into view may be positioned accurately based on the new search model. As scene motion progresses, the second logo position may be determined by scene track models, but its starting position may be improved by the better search model.

Figure 13:
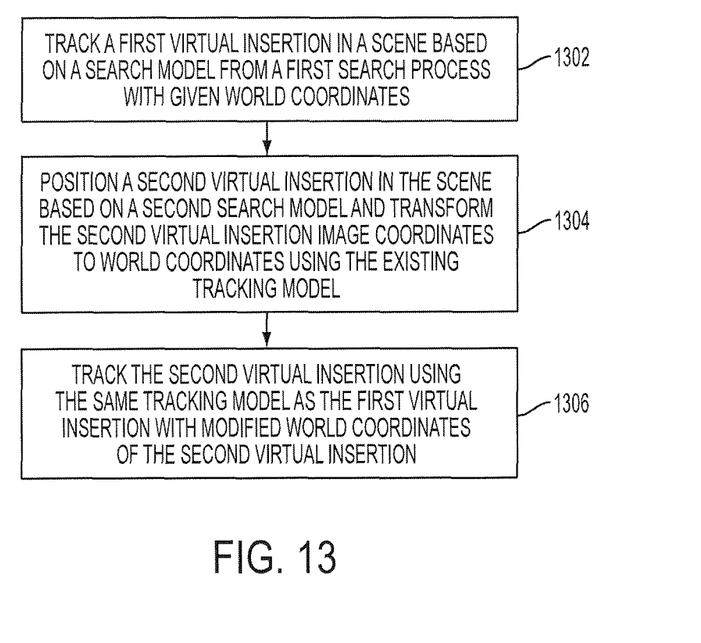
FIG. 13 is a flowchart of an exemplary tracking method according to an embodiment of the present invention.

An example of such a method is illustrated in FIG. 13. In step 1302, a first virtual insertion in a scene is tracked using a camera model obtained in a first search process. In step 1304, a second virtual insertion is positioned in the scene using reference points obtained in a second search process. In step 1306, the second virtual insertion is tracked using the same tracking model as the first virtual insertion. In an embodiment, such tracking translates the logo image coordinates from the second search model into world coordinates generating new world coordinates for the second logo. By doing so, the second virtual insertion can be inserted into the scene without accrual of errors resulting from tracking the first virtual insertion, and without disturbing the appearance of the first virtual insertion.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of adding a virtual insertion to an input video sequence, comprising:
    searching the input video sequence for reference features within a plurality of input images, the reference features being dynamic and stored in a reference feature database;
    extracting features from a first input image, a plurality of extracted features being dynamic and the input image being contained in the input video sequence;

associating the extracted features with reference features in the reference feature database;

generating a camera model based on the associations between the extracted features and the reference features;

refining the camera model based on further extracted features from further input images;

mixing a virtual insertion into the video sequence based on the refined camera model; and outputting an output video sequence containing the virtual insertion.

2. The method of claim 1, wherein the refining step includes iteratively repeating the searching, extracting, associating and generating steps.

3. The method of claim 2, wherein iteratively repeating comprises:

identifying one or more fixed reference features based on a camera model generated in a previous iteration; and generating an updated camera model using the one or more fixed reference features.

4. The method of claim 1, wherein the extracting step is automated.

5. The method of claim 1, further comprising:

calibrating a scene prior to extracting features from an input image.

6. The method of claim 5, wherein calibrating comprises:

mapping locations in a reference image to locations in a unifying reference space;

generating a reference camera model based on the association between the reference image locations and the reference space locations;

extracting reference features from the reference camera model, the plurality of reference features including a dynamic object; and updating the reference feature database with the extracted reference features.

7. The method of claim 6, wherein mapping comprises determining reference point world coordinates relative to known landmarks in a scene.

8. The method of claim 5, wherein calibrating a scene occurs prior to an event.

9. The method of claim 5, further comprising repeating the calibrating step when the features to be extracted from the input image have changed substantially from the reference features in the database.

10. The method of claim 5, further comprising repeating the extracting step when the camera model based on the associations between the extracted features and the reference features cannot be generated within a given amount of time.

11. The method of claim 1, wherein the searching, extracting, associating, generating, mixing, and outputting steps are performed substantially in real time.

12. The method of claim 1, wherein the dynamic features include spectators at a sporting event.

13. A method of adding a virtual insertion to a video sequence, comprising:

generating a biased camera model using a statistically selected subset of a plurality of non-fixed regions of an image contained in the video sequence, wherein the biased camera model provides approximate information regarding locations of reference objects;

searching the video sequence to locate a fixed reference object in the image using the biased camera model as an entry point for a restricted location search;

generating a corrected camera model using the fixed reference object in the image to refine the biased camera model;

further refining the corrected camera model based on further extracted features from a further image contained in the video sequence;

adding a virtual insertion to the video sequence using the corrected camera model; and outputting the video sequence having the virtual insertion.

14. The method of claim 13, wherein the virtual insertion is an advertisement.

15. The method of claim 13, wherein the non-fixed regions of an image comprise spectators at an event.

16. The method of claim 13, wherein the fixed reference object is a boundary marking.

17. The method of claim 13, wherein the method is performed substantially in real time.

18. The method of claim 13, wherein generating a biased camera model comprises inputting dynamic reference points into one or more of a random sample consensus algorithm, a reference point culling algorithm, or an error minimization algorithm.

19. The method of claim 13, wherein generating a corrected camera model comprises calculating a homography using a pairs of points technique.

20. The method of claim 13, wherein generating a corrected camera model comprises minimizing the distances between fixed reference points in the image and corresponding reference points in a world coordinate system.

21. A method of tracking multiple virtual insertions in a video scene, comprising:

searching a first video scene for reference features in a first camera model;

tracking a first virtual insertion based on a first camera model obtained in the first search process;

searching a second video scene for further reference features in a second camera model;

positioning a second virtual insertion based on the second camera model obtained in a second search process; and tracking the second virtual insertion based on the first camera model.

22. The method of claim 21, wherein tracking a first virtual insertion comprises using a camera model obtained in a first search process and world coordinates, and tracking the second virtual insertion comprises translating image coordinates obtained in the second search process into the world coordinates.

* * * * *